US005529442A

United States Patent [19]
Jorgensen et al.

[11] Patent Number: 5,529,442
[45] Date of Patent: Jun. 25, 1996

[54] MOTORIZED TAP TOOL DRIVING APPARATUS

[75] Inventors: Glenn F. Jorgensen, Ridgewood, N.J.; Michael W. Kelly, Joliet, Ill.

[73] Assignees: Power House Tool, Inc., Joliet, Ill.; JNT Technical Services, Inc., Little Ferry, N.J.

[21] Appl. No.: 237,883

[22] Filed: May 4, 1994

[51] Int. Cl.6 .................................................. B23B 39/00
[52] U.S. Cl. ............................. 408/87; 408/88; 408/203; 408/222; 408/237; 408/90
[58] Field of Search .................... 408/84, 87, 88, 408/203, 222, 236, 237, 234, 89, 90, 91; 470/18–26, 96–105; 82/113; 409/178, 179

[56] References Cited

U.S. PATENT DOCUMENTS

| | | | |
|---|---|---|---|
| 3,071,988 | 1/1963 | Gibson | 408/88 |
| 3,146,675 | 9/1964 | Anderson | 408/84 |
| 3,148,562 | 9/1964 | Moss | 408/88 |
| 3,466,681 | 9/1969 | Benjamin et al. | 470/96 |
| 3,699,828 | 10/1972 | Piatek et al. | 409/178 |
| 4,682,919 | 7/1987 | Mitchell | 409/179 |
| 4,759,666 | 7/1988 | Grab | 408/84 |
| 4,993,189 | 2/1991 | Cloutier et al. | 408/91 |

OTHER PUBLICATIONS

Norbar Torque Tools Catalogue.

Primary Examiner—Daniel C. Crane
Assistant Examiner—Ed Tolan
Attorney, Agent, or Firm—Hill, Steadman & Simpson

[57] ABSTRACT

A hole tapping device having a motor driven tapping tool with a bracing frame for resisting reverse torque on the motor frame caused by resistance of the rotation of the tapping tool within a bore being tapped. The bracing frame has adjustable arms which provide adjustment in the radial and angular direction and which clamp stationary protrusions on the workpiece with rollers to hold the bracing frame against rotation in both directions about the axis of the bore. The adjustments of the frame provide great geometric versatility. The rollers provide for a smooth translation of the motor and bracing frame along the axis of the bore being tapped. A single coupler and a series of inserts allow for a series of differently sized tap tools to be driven through the use of a single coupler.

27 Claims, 3 Drawing Sheets

MOTORIZED TAP TOOL DRIVING APPARATUS

BACKGROUND OF THE INVENTION

The present invention relates to an apparatus for driving a threading cutter, in particular, a motorized apparatus for driving a tap tool for threading or rethreading a bore wherein the apparatus provides an adjustable frame for bracing the apparatus against counter rotation induced by the cutting force of the tap tool.

In industrial and power plant applications, the rethreading of bores for acceptance of threaded studs or bolts is often needed. The rethreading or the cutting of threads in these bores is a laborious task requiring high torque to cut the threads. Where manually driving the tapping device with a lever arm is not practical or sufficiently rapid, a motorized tap driving apparatus is used. Typically these motorized tap driving apparatus have a high torque motor applied to a gear reducer/clutch which drives the tap tool. Such motorized tap tools require a means to brace the frame of the motor to prevent counter rotation of the frame caused by the resistance of the tap tool to rotation due to friction or cutting force in the cutting operation.

Known methods of bracing the motor frame against counter rotation lack sufficient flexibility to adapt the apparatus to various close quarters and configurations which require retapping of bores.

Generally, each tap tool is useful for cutting threads of a particular diameter. Different tap tools are required for different diameters. The tap tools have a polygonal end which is engaged with an adapter to connect with a rotating driving protrusion on the motor. The different diameter tap tools have different sized ends, requiring different adapters for each tap tool.

SUMMARY OF THE INVENTION

It is an object of the present invention to provide a thread cutting apparatus which utilizes a motor drive and which can be adapted to mount to a variety of structures having threads to be cut or rethreaded. It is an object of the present invention to provide a motorized tapping apparatus having an adjustable frame to allow the apparatus to be installed in close quarters in a variety of geometric situations to provide sufficient torque bracing of the apparatus for operation. It is an object of the present invention to provide a motorized tapping apparatus having a frame for bracing the motor frame which can be adjusted radially and angularly. It is an object of the present invention to provide a motorized tapping apparatus which provides a frame which, once installed, provides bracing against counter rotation in both clockwise and counterclockwise rotational directions. It is an object of the present invention to provide a motorized tapping apparatus which is guided during its axial descent and ascent with respect to the bore being tapped. It is an object of the present invention to provide a coupling arrangement between the motor and a driven tap tool which allows a singular coupling to be used for a variety of tap sizes, particularly square or hexagonal drive parts.

The objects are inventively achieved in that a tapping apparatus is provided which has a pneumatic, electric or other type motor arranged having a rotating shaft alignable with a bore to be tapped, a stationary motor frame, and a bracing frame having outriggers or arms which extend outward from the motor frame and brace against stationary structure to prevent reverse turning of the motor frame upon applying torque along the rotating shaft to a tap tool located within the bore. The outriggers have portions which may be adjusted both radially from the bore and angularly relative to the bore. The outriggers include a first stationary arm extending radially from the frame. A second stationary arm projects from the frame approximately 180° from the first arm. On the second arm, a third arm is attached pivotally at a base end and connected at its distal end to a distal end of the second arm by an adjustable threaded rod, such that the angular position of the third arm with respect to the second arm can be adjusted. Roller guide assemblies are mounted to the first arm outrigger and to one of the second and third arms. The roller guide assemblies are mounted by a bolt within a radially oriented slot formed in the arm members to be radially slidable with respect thereto and fixable in radial position. Each roller assembly comprises brackets extending perpendicularly from the arm to which it is attached. The brackets hold two rollers and the distance between the rollers is adjustably fixable.

In operation, the brackets and rollers are adjustable in position to capture two stationary members such as protruding studs on the structure which is to have a bore rethreaded. The adjustment is accomplished by sliding the brackets through the slots of the appropriate arm members and also adjusting the third arm pivotably with respect to the second arm by adjusting the threaded rod, and by adjusting the position of the rollers with respect to the brackets. The combination of these five adjustments gives great flexibility to capture two studs or stationary rods somewhere on the structure being rethreaded. Because the rollers capture the stationary rods, the frame can resist counter rotation in either rotary direction such as when the tap is being inserted or removed, without further adjustments. The rollers allow reduced friction axial movement of the apparatus during tapping.

A series of inserts and a single coupler can be used to accommodate a series of different diameter tap tools. The single coupler should have a receiving aperture sized to receive the largest tap tool in the series. All other tap tools (which have a driven end smaller than the largest tap tool in the series) will use one of a series of inserts between the tap tool and the coupler. The inserts have an outside dimension to fit into the coupler and an inside opening sized to receive a particular tap tool. Thus, only a single coupler is required for a series of sizes of tap tools and a series of small, relatively inexpensive inserts are used to replace the series of large, relatively expensive couplers previously required.

DETAILED DESCRIPTION OF THE PREFERRED EMBODIMENTS

Figure 1:
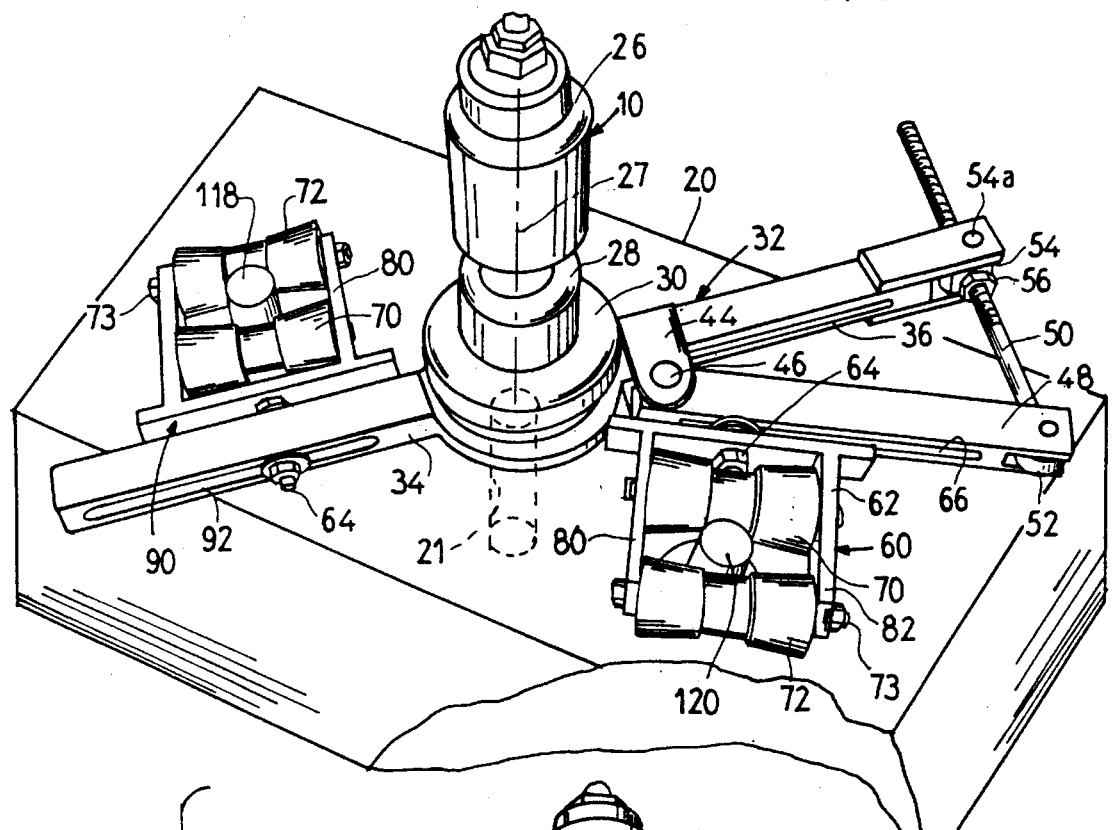
FIG. 1 is a perspective view of the apparatus of the present invention.

FIG. 1 shows a motorized tap tool driving apparatus 10 acting on a machine casing 20, shown schematically as a block, tapping a bore 21 in the casing. The casing can be a pump casing or any other structure where a hole must be rethreaded or threads cut. The apparatus provides a motor drive 26 which can be electric or pneumatic or driven by another source of rotary power. The motor 26 is mounted to a gear box/clutch 28 arranged in alignment with its axis 27. The gear box/clutch 28 is mounted to a hub 30 of a frame 32. The frame 32 provides extending from the hub 30, a first brace or arm 34 and a second brace or arm 36. A rigid connection is provided between the arms 34, 36 and the hub 30. The motor 26 provides an axially arranged rotary driven shaft (not shown) which proceeds to the gear box/clutch 28 which provides an output shaft 40, shown in FIG. 2, which is rotatable independent of the hub 30. A bracket 44 is rigidly connected to the second arm 36 and extends perpendicularly thereto. Mounted at a pin connection 46 to the bracket 44 is a third arm 48. The distal ends of the second arm 36 and the third arm 48 are connected by a threaded rod 50 which has an eye bolt connection 52 at the third arm and a pivotable apertured connection 54 about a pin 54a at the second arm 36. The extent of the threaded rod 50 arranged between the second and third arms can be adjusted by positioning nuts 56, 58 (shown in FIG. 4) on the shaft 50. The third arm 48 pivots about the pin 46 to select angles between the second and third arms.

Figure 3:
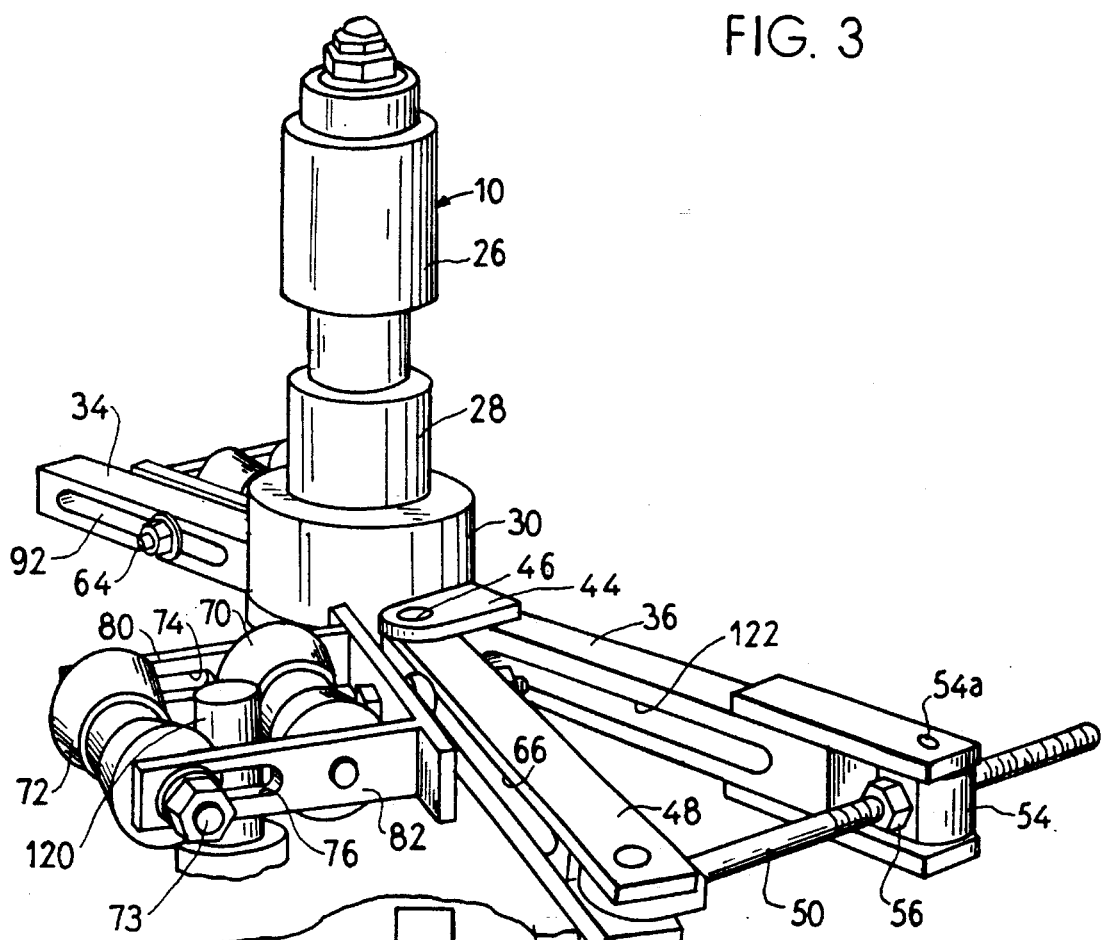
FIG. 3 is a partial perspective view of the apparatus of FIG. 1.

Mounted on the third arm 48, on a side opposite the second arm 36, is an adjustable roller assembly 60. The adjustable roller assembly 60 provides a U-shaped bracket 62 connected by a fastener 64 to the third arm 48, particularly residing in a slot 66 in the third arm 48 so that the U-shaped bracket 62 can be slid in a generally radial direction with regard to the apparatus 10. Mounted within the U-shaped bracket is a first roller 70 and a second roller 72 substantially in parallel. The rollers 70, 72 are adjustable in position toward and away from each other by a fastener 73 slidable within slots 74, 76 through the side walls 80, 82 of the U-shaped bracket. At a select position, the fastener is tightened to fix the roller 72 within the slots. The rollers can both be slidable through the slots or one of the rollers can be fixed in position and the other roller slidable toward and away from the fixed roller, as shown in FIG. 3.

A second roller assembly 90, substantially identical to the first roller assembly 60, is applied to the first arm facing toward an opposite side from the first roller assembly 60 and is movable along a slot 92 and held in a selected position by a fastener 64.

Figure 2:
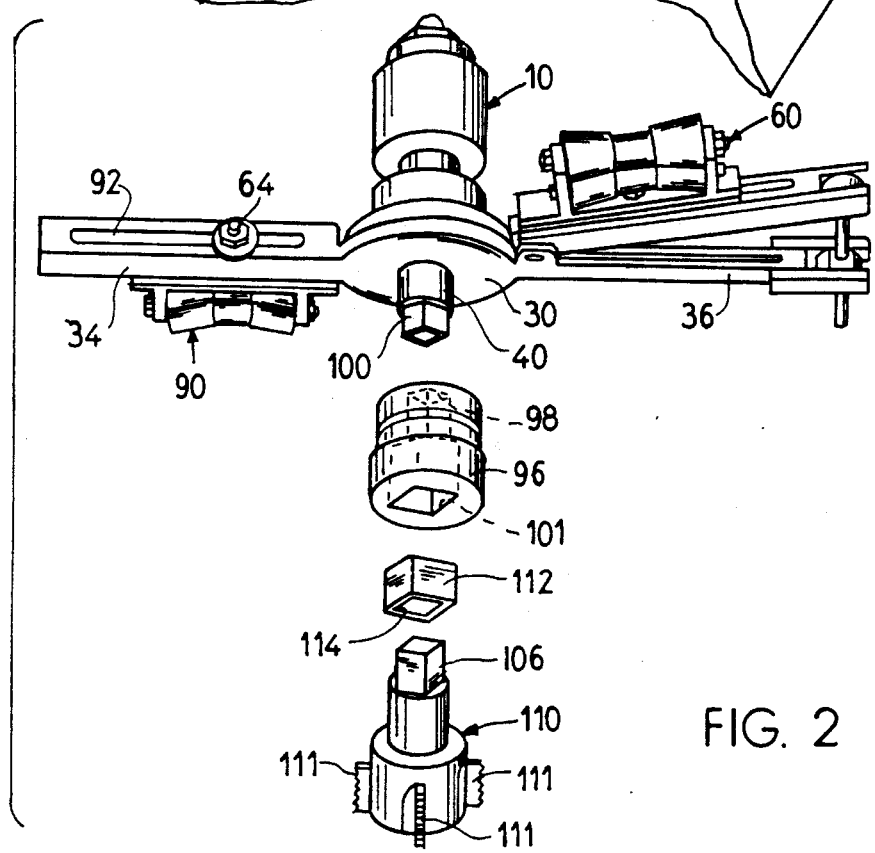
FIG. 2 is an exploded perspective view of the apparatus of FIG. 1.

FIG. 2 illustrates the apparatus 10 in more detail which includes a coupler 96 with a polygonal aperture 98 for receiving a complementary polygonal protrusion 100 of the output shaft 40. At an opposite end, a second polygonal aperture 101 receives a polygonal protrusion 106 of a tap tool 110. According to the present invention, a cubical adaptor or insert 112 having a square cross section aperture 114 can be used to allow connection between the aperture 101 and a plurality of tap tools having differing size protrusions 106. Since tap tools generally have varying sized protrusions 106 for varying diameter taps, a series or set of inserts 112 can more economically be provided than a plurality of different heavy duty couplers 96.

FIGS. 5a–5d illustrate a series of inserts 112a, 112b, 112c, which each have a diameter D1 equal to a diameter D2 of the aperture 101. Insert 112a has an internal diameter D3 of an aperture 114a equal to a diameter D4 of a protrusion 106a of a tap tool 110a. Diameter D3, however, is less than a diameter D5 of an aperture 114b which is equal to a diameter D6 of a protrusion 106b of a tap tool 110b. Diameter D5, in turn, is less than a diameter D7 of an aperture 114c which is equal to a diameter D8 of a protrusion 106c of a tap tool 110c. The single coupler 96 should have the receiving aperture 101 with the diameter D2 sized to receive a diameter D9 of a protrusion 106d of a largest tap tool 110d in the series. All of the other tap tools in the series 110a–110d (which may include more than the exemplary tools shown) have a smaller diameter, thus requiring the use of an insert 112a–112c. The series of inserts 112a–112c, which have a common external diameter D1, are much smaller and less expensive to manufacture than a series of different sized couplers which would be required if the series of inserts were not available.

In operation, referring to FIGS. 1–4, the tap tool 110 having thread cutting chasers 111 is connected via the insert 112. The coupler 96 is connected to the output shaft 40 and the apparatus 10 is applied over a hole to be threaded. Since torque imposed on the tap tool 110 from the motor 26 causes an equal and opposite torque on the motor frame 26, this opposite torque must be resisted by the frame to create a turning of the tap 110 in the hole. Otherwise, friction would hold the tap stationary and the motor frame would spin in an opposite direction.

To brace the frame against rotation, studs 118, 120 proceeding outwardly of the casing 20 are captured by the roller assemblies 60, 90. Depending on the location of these studs, the frame can be adjusted to capture them by radially sliding the second roller assembly 90 along the first arm 34, by angularly positioning the third arm 48 with respect to the second arm 36 by the rod 50, and by radially sliding the first roller assembly 60 with respect to the third arm 48. If the geometry of the studs 118, 120 requires it, the second roller assembly 90 can be reversed to the opposite side of the first arm 34 and the first roller assembly 60 can be attached to the second arm 36 to slide along a slot 122 (FIG. 3). The rollers 70, 72 are adjusted within the U-shaped brackets 60 to closely capture the rod 118, 120 therebetween. The frame 32 is now braced against rotary movement in either direction. Another advantage of the invention is that when the motor is reversed to withdraw the tap, the frame need not be reversed to brace for reverse rotation.

As the tap proceeds downwardly into the hole, the frame, which initially is raised above the surrounding surface, moves downwardly with it. Therefore, the rollers 70, 72 not only can brace against the rods 118, 120, but provide for a rolling action as the frame 32 moves downwardly toward the machine casing 20 and, when the reverse procedure during withdrawing is undertaken, the rollers can roll upwardly.

Figure 4:
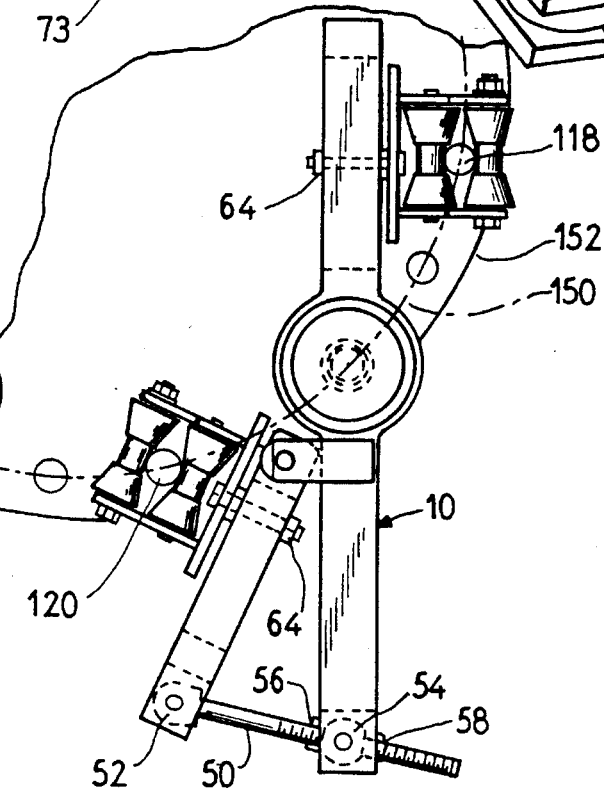
FIG. 4 is a top plan view of the apparatus of FIG. 3 applied to a flange member.
Figure 5A:
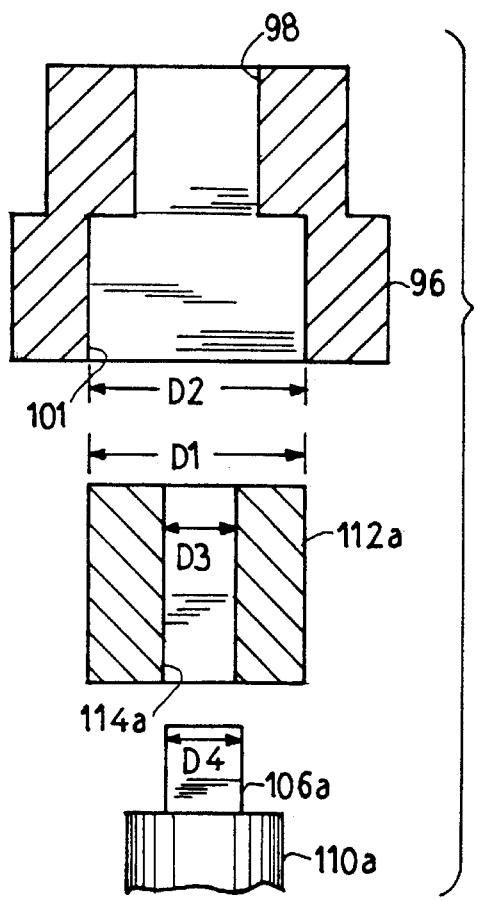
FIGS. 5a–5d are a series of side sectional views of a series of different sized tap tools, a single coupler and a series of different sized inserts.
Figure 5B:
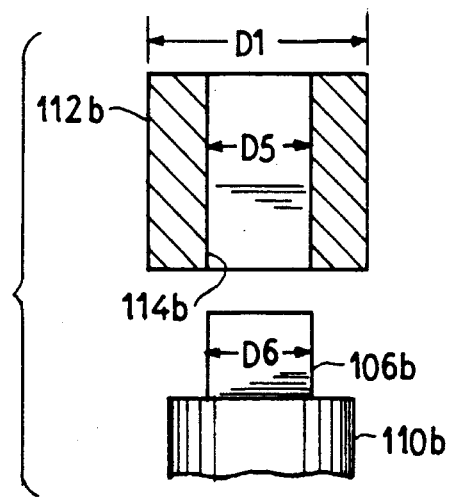
Figure 5C:
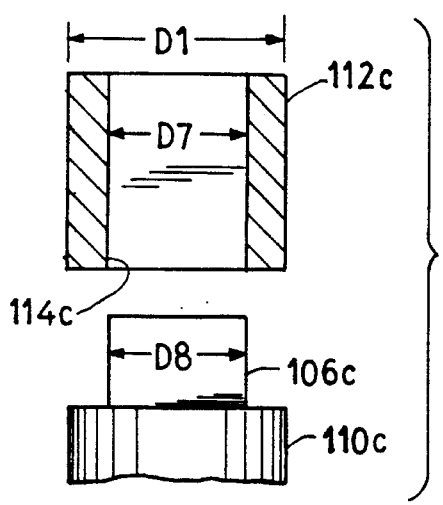
Figure 5D:
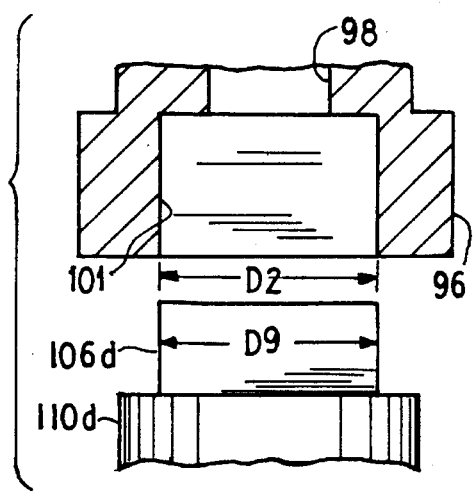

As shown in FIG. 4, the invention is particularly useful applied to positions around a typical bolt circle 150 of a large diameter flange 152 wherein the anchoring studs 118, 120 can be at positions around the bolt circle.

The invention provides a frame with adjustable arms which allows great flexibility for configuring the tapping tool onto a hole to be tapped where the bracing studs can be at a variety of locations.

Although the present invention has been described with reference to a specific embodiment, those of skill in the art will recognize that changes may be made thereto without departing from the scope and spirit of the invention as set forth in the appended claims.

We claim as our invention:

1. An apparatus for forming threads in a bore of a workpiece, comprising:

a tap tool having thread forming chasers at positions around its circumference and a drive connection for rotating the tap tool;

a motor means for connecting to said drive connection and rotating said tap tool, said motor means having a driven shaft and a stationary casing;

a frame connected to said stationary casing and having a first arm extending outwardly from a rotary axis of said driven shaft, said first arm having first means applied thereon for capturing a first object held stationary relative to said workpiece to resist rotation of said frame in either direction about said axis of said driven shaft, said first means for capturing comprising roller means for allowing travel of said first means in a direction parallel to the rotary axis of said driven shaft.

2. An apparatus for forming threads in a bore of a workpiece, comprising:

a tap tool having thread forming chasers at positions around its circumference and a drive connection for rotating the tap tool;

a motor means for connecting to said drive connection and rotating said tap tool, said motor means having a driven shaft and a stationary casing;

a frame connected to said stationary casing and having a first arm extending outwardly from a rotating axis of said driven shaft, said arm having first means applied thereon for connecting said arm to a first object held stationary relative to said workpiece to resist rotation of said frame in either direction about said axis of said driven shaft; and wherein said frame further comprises a second arm extending outwardly from said axis of said driven shaft, said second arm having second means for capturing a second object held stationary relative to said workpiece, said second arm adjustable in fixed angular position around an axis of said bore.

3. The apparatus according to claim 2, wherein at least one of said first means for capturing and said second means for capturing is adjustable in radial position from said axis of said bore.

4. The apparatus according to claim 2, wherein both of said first means for capturing and said second means for capturing are adjustable radially with respect to said axis of said bore.

5. The apparatus according to claim 1, wherein said first means for capturing is adjustable radially with respect to an axis of said bore.

6. The apparatus according to claim 1, wherein said drive connection comprises a single coupler with a first aperture sized to snugly receive said driven shaft at one side and a second aperture sized to receive a tap tool at an opposite side, and a series of inserts, each having an outside shape sized to snugly fit in said second aperture and an internal aperture sized to snugly receive one of a series of differently sized tap tools.

7. An apparatus for forming threads in a bore of a workpiece, comprising;

a tap tool having thread forming chasers at positions around its circumference and a drive connection for rotating the tap tool;

a motor means for connecting to said drive connection and rotating said tap tool, said motor means having a driven shaft and a stationary casing;

a frame connected to said stationary casing and having a first arm extending outwardly from a rotating axis of said driven shaft, said arm having first means applied thereon for connecting said arm to a first object held stationary relative to said workpiece to resist rotation of said frame in either direction about said axis of said driven shaft; and wherein said roller means of said first means for capturing comprises two rollers arranged to capture said first object therebetween, said rollers free to roll as said tap tool translates along an axis of said bore during tapping.

8. The apparatus according to claim 7, wherein said rollers are held within a bracket having sidewalls, at least one of said rollers mounted for select positioning along parallel slots formed in said sidewalls.

9. The apparatus according to claim 8, wherein said bracket is mounted to said first arm by a fastener engaging a slot in said first arm, said bracket movable radially along said slot with respect to said bore.

10. An apparatus for forming threads in a bore of a workpiece, comprising:

a tap tool having thread forming chasers at positions around its circumference and a drive connection for rotating the tap tool;

a motor means for connecting to said drive connection and rotating said tap tool, said motor means having a driven shaft and a stationary casing;

a frame connected to said stationary casing and having a first arm extending outwardly from a rotating axis of said driven shaft, said arm having first means applied thereon for connecting said arm to a first object held stationary relative to said workpiece to resist rotation of said frame in either direction about said axis of said driven shaft; and further comprising a second arm extending outwardly from said axis of said driven shaft, said second arm comprising a first arm portion angularly fixed with respect to said motor casing and a second arm portion pivotally connected at a base end to said first arm portion, and means for selectively pivoting said second arm portion with respect to said first arm portion and locking a pivoted position thereof, said second arm portion having means for capturing a second object held stationary relative to said workpiece.

11. The apparatus according to claim 10, wherein said means for locking comprises a threaded rod which can be selectively progressed to set said pivoted position.

12. An apparatus for tapping a threaded hole in a workpiece comprising:

a tapping tool having thread cutting chasers at a distal end and an actuating shaft extending therefrom, axially aligned with an axis of said bore to be tapped;

a motor arranged above said bore and connected to said actuating shaft for rotating said actuating shaft, said motor having a stationary motor frame;

an anchor frame having a hub connected to said motor frame and stationary therewith, a first arm rotationally fixed to said hub and extending radially therefrom, a second arm rotationally fixed to said hub and extending radially therefrom, and a third arm pivotably connected to said hub at a base end and having means for fixing an angular position of said third arm member with respect to said second arm member;

a first engagement means for engaging an object held stationary relative to said workpiece, said first engaging means mounted radially slidably along said first arm member; and a second engagement means mounted radially slidably on said third arm member, for engaging a second object held stationary relative to said workpiece.

13. The apparatus according to claim 12, wherein said means for fixing the angular position of said third arm member comprises an elongate threaded rod connected between said second and third arm members.

14. An apparatus for tapping a threaded hole in a workpiece comprising::
- a tapping tool having thread cutting chasers at a distal end and an actuating shaft extending therefrom, axially aligned with an axis of said bore to be tapped;
- a motor arranged above said bore and connected to said actuating shaft for rotating said actuating shaft, said motor having a stationary motor frame;
- an anchor frame having a hub connected to said motor frame and stationary therewith, a first arm rotationally fixed at a base end thereof to said hub and extending radially outwardly therefrom, a second arm extending radially from said hub at a base end thereof and connected rotationally to said hub about said axis of said bore, and means for fixing an angular position of said second arm member relative to said first arm member.

15. The apparatus according to claim 14 further comprising:
- a first means for abutting an object held stationary relative to said workpiece, said first means slidably mounted on said first arm member; and
- a second means for abutting a second object held stationary relative to said workpiece, slidably mounted on said second arm member.

16. The apparatus according to claim 15, wherein said means for fixing the angular position of said second arm member comprises an elongate threaded rod means connected between said arm member and said hub for selectively lengthening or contracting to fixedly position said second arm member.

17. The apparatus according to claim 15, wherein at least one of said first and second means captures a respective one of said first and second stationary objects to resist rotation of said anchor frame about said axis of said bore in both rotational directions.

18. The apparatus according to claim 17, wherein said one of said first and second means for abutting comprises two rollers arranged to capture said first object therebetween, said rollers free to roll as said tap machine translates along an axis of said bore during tapping.

19. The apparatus according to claim 18, wherein said rollers are held within a bracket having sidewalls, at least one of said rollers mounted for select positioning along parallel slots formed in said sidewalls.

20. The apparatus according to claim 19, wherein said bracket is mounted to a respective first or second arm by a fastener engaging a slot in said first arm, said bracket movable along said slot with respect to said bore.

21. An apparatus for machining a portion of a stationary workpiece, comprising:
- a machining tool to be rotated about an axis;
- a motor means for connecting to said tool and rotating said tool, said motor means having a driven shaft and a stationary casing;
- a frame having a hub portion with an aperture, said tool penetrating said aperture, a first arm extending outwardly from said hub, said first arm having first means applied thereon for capturing a first object held stationary relative to said workpiece, and a second arm having second means applied thereon for capturing a second object held stationary relative to said workpiece, said second arm rotationally connected to said hub, means for fixing said second arm in rotary orientation with respect to said hub, said first and second arms arranged to resist rotation of said frame in either direction about said axis of said tool.

22. The apparatus according to claim 21, wherein said stationary casing of said motor means is connected to said frame.

23. The apparatus according to claim 21, wherein said first means for capturing and said second means for capturing each comprise a roller for allowing rolling movement of said means for capturing in a direction parallel to an axis of rotation of said tool.

24. The apparatus according to claim 21, wherein at least one of said first means for capturing and said second means for capturing is adjustable in radial position from said axis of said tool.

25. The apparatus according to claim 21, wherein said second arm comprises a first arm portion angularly fixed with respect to said frame and a second arm portion pivotally connected at a base end to said first arm portion, and means for selectively pivoting said second arm portion with respect to said first arm portion, and means for locking a pivoted position of said second arm portion with respect to said first arm portion.

26. The apparatus according to claim 25, wherein said means for locking comprises a threaded rod which can be selectively progressed to set said pivoted position.

27. The apparatus according to claim 21, wherein said tool comprises a thread tapping tool.

* * * * *